(12) United States Patent
Miao et al.

(10) Patent No.: US 7,711,099 B2
(45) Date of Patent: May 4, 2010

(54) METHOD AND NETWORK STRUCTURE FOR MOVING A CALL LEG

(75) Inventors: Caixia Miao, Shenzhen (CN); Hao Liu, Shenzhen (CN); Shaojie Mei, Shenzhen (CN); Yan Li, Shenzhen (CN); Yong Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1099 days.

(21) Appl. No.: 11/315,435

(22) Filed: Dec. 22, 2005

(65) Prior Publication Data

US 2006/0140377 A1 Jun. 29, 2006

Related U.S. Application Data

(63) Continuation of application No. PCT/CN2004/000515, filed on May 21, 2004.

(30) Foreign Application Priority Data

Jun. 25, 2003 (CN) ............... 03 1 37492

(51) Int. Cl.
*H04M 3/42* (2006.01)
(52) U.S. Cl. .................. 379/201.01; 379/201.03; 379/201.04; 379/201.1; 379/202.01
(58) Field of Classification Search ........... 379/201, 379/202, 212, 201.01, 201.03, 201.04, 201.1, 379/202.01, 212.01; 704/275
See application file for complete search history.

(56) References Cited

U.S. PATENT DOCUMENTS 4,897,866 A * 1/1990 Majmudar et al. ..... 379/201.05

5,533,110 A * 7/1996 Pinard et al. ........... 379/355.01
5,940,488 A * 8/1999 DeGrazia et al. ......... 379/93.23

(Continued)

FOREIGN PATENT DOCUMENTS

EP 1 107 560 A1 6/2001

(Continued)

OTHER PUBLICATIONS

International Search Report for PCT/CN2004/000515, dated Sep. 2, 2004.

(Continued)

*Primary Examiner*—Curtis Kuntz
*Assistant Examiner*—Phung-Hoang J Nguyen
(74) *Attorney, Agent, or Firm*—Marshall, Gerstein & Borun LLP

(57) ABSTRACT

Disclosed herein is a method and a network structure for moving a call leg, and implementing a call leg move with the network structure. The method includes creating a call leg moving interface and its method interface reference parameters, which are used to move a call leg from an original call to a destination call. The interface reference parameters are an identifier of a call leg to be moved and a destination call identifier. The method further includes, if an application wants to move the call leg, determining the interface reference parameters according to the call leg and the destination call, and invoking the call leg moving interface to move the call leg from the original call to the destination call with the interface reference parameters. In this manner, the disclosed method provides a simple, convenient, easy to implement and spread interface to the application to move the call leg from one call to another.

11 Claims, 4 Drawing Sheets

U.S. PATENT DOCUMENTS

| | | | | |
|---|---|---|---|---|
| 6,111,943 | A | 8/2000 | Strom et al. | 379/211 |
| 6,115,461 | A | 9/2000 | Baiyor et al. | 379/211 |
| 6,574,325 | B1 | 6/2003 | Baiyor et al. | 379/211.01 |
| 7,003,086 | B1 * | 2/2006 | Shaffer et al. | 379/202.01 |
| 2006/0100884 | A1 * | 5/2006 | Thorner | 704/275 |

OTHER PUBLICATIONS

First Examination Report from India Patent Office in application No. 5988/DELNP/2005 dated Jun. 4, 2007.

Parlay APIs 2.1, "Call Processing Sequence Diagrams," The Parlay Technical Team (2000).

Parlay APIs 2.1, "Generic Call Control Service Interfaces," The Parlay Technical Team (2000).

European Office Action for Application No. 04734207.6-2414, dated Jun. 14, 2006.

Peru Office Action for Application No. 000607-2004/OIN, received Apr. 16, 2007.

* cited by examiner

METHOD AND NETWORK STRUCTURE FOR MOVING A CALL LEG

CROSS-REFERENCES TO RELATED APPLICATIONS

This is a continuation of International Application No. PCT/CN2004/000515, which was filed on May 21, 2004, and which, in turn, claimed the benefit of Chinese Patent Application No. 03137492.1, which was filed on Jun. 25, 2003, the entire disclosures of which are hereby incorporated herein by reference.

BACKGROUND OF THE DISCLOSURE

1. Field of the Technology

The present invention relates generally to call moving technology in a telecommunication system and, more particularly, to a method and network structure for moving a call leg.

2. Background of the Invention

In a telecommunication system, based on actual requirements, there is a multiparty call mode. In this mode, a call has three or more call parties, and each party is referred to as a call leg. A call leg communicates with other call legs that belong to the same call. During communication, based on requirements, a call leg may need to move from one call to another, and then communicate with call legs of another call.

In current technologies, an application server encapsulates and makes abstracts of the underlying telecommunication network capabilities to provide a simple and open service capacity interface to applications, and the application services are created through the open service capacity interface. For the multiparty call situation mentioned above, current technology, such as Parlay/OSA API, provides only creating leg and releasing leg methods that cannot move a leg from one call to another directly. With this technology, when a leg of one call wants to move to another call, the only way to proceed is, first, release from the original call to terminate the connection with the original call, and then create the leg in the destination call to connect with the destination call. While, in this way, a call leg can be moved from one call to another, for the user using this leg to communicate, the call leg must create a new connection with the destination call after the release from the original call. Not only is this approach complex, but also during the call move, the user communication is interrupted so as to interfere the continuity of communication, and data and states in the original call are changed so as to lose some important information. This is undesirable for services that need communication continuity, such as a charging service.

As described above, current technology cannot implement a call leg move from one call to another without terminating the communication of this leg.

SUMMARY OF THE INVENTION

In accordance with one aspect of the disclosure, a method is useful for implementing a call leg move, and may include the following steps:

(A) creating a call leg moving interface and its method interface reference parameters, which are used to move a call leg from an original call to a destination call, where the interface reference parameters are an identifier of a call leg to be moved and a destination call identifier; and, (B) if an application wants to move the call leg to be moved, determining the interface reference parameters according to the call leg and destination call, and invoking the call leg moving interface to move the call leg from the original call to the destination call with the interface reference parameters.

In some cases, moving the call leg to the destination call includes the following steps:

(B1) an application notifying the original call that the call leg is being moved to a destination call;

(B2) the original call breaking resource occupied by the call leg, changing an original call identifier to the destination call identifier through setting the call message of the call leg, and sending a call leg move request to the destination call; and, (B3) having received the call leg move request sent from the original call, the destination call determining whether its resource is enough, and if it is enough, the destination call allocating resource to the leg, in which case, the call leg move is successful, and otherwise it is not successful.

After step (B3), the method may further include the destination call notifying the application about a call leg move result.

In some cases, step (B) may include notifying a user terminal corresponding to the call leg to be moved that the call leg is moving to the destination call.

Changing the original call identifier to the destination call identifier through setting the call message of the call leg in step (B2) may include keeping unchanged at least a media type, a charging policy, and terminal information in the call message.

In some embodiments, the original call and destination call are respective multiparty calls.

Moving the call leg in step (B) may include maintaining the call leg in a suspending state in the original call.

In accordance with another aspect of the disclosure, a network structure is useful for a call leg move that includes a telecommunication network, a capability-abstracting layer and an application layer. The capability-abstracting layer abstracts capabilities of the telecommunication network into independent functions, and each independent function provides a corresponding interface to the application layer. Through invoking interfaces, the application layer can provide services that are implemented by the independent functions. The capability-abstracting layer includes both a call leg moving function, and a call leg moving interface provided to the application layer with at least two parameters an identifier of a call leg to be moved and a destination call identifier.

In some cases, the call leg moving interface is a newly added interface to Parlay/OSA API with at least two parameters, namely the identifier of the call leg to be moved and the destination identifier.

In some cases, the call leg moving interface is a newly added open interface with at least two parameters, namely the identifier of the call leg to be moved and the destination call identifier.

The call leg moving interface may further include one 'out' parameter for showing a result of call leg move, e.g., true or false.

In accordance with yet another aspect of the disclosure, a method and network structure generally provide a call leg moving interface to an application layer. When an application wants to move a call leg, it invokes the call leg moving interface to implement the call leg move. When a call leg is moved to another call, the communication of this leg is not terminated for the reason of the call leg move, thereby providing continuous communication service. As a result, the data and states in the original call are maintained, so communication continuity in the original call can be maintained. This result is beneficial for services with continuity requirements, such as continuously charging, etc.

The disclosed method and network structure generally provide a simple, convenient, easy to implement, and easy to spread service for call leg moves from one call to another.

DETAILED DESCRIPTION OF PREFERRED EMBODIMENTS

The disclosed method and network structure will now be described more fully hereinafter with reference to the accompanying drawings, in which preferred embodiments thereof are shown. The disclosed method and network structure may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Disclosed herein is a method and network structure that generally provide an open interface for call leg moving to applications. Through the open interface, an application implements some services with relational function including call leg moving service such as call hold and call moving etc.

Figure 1:
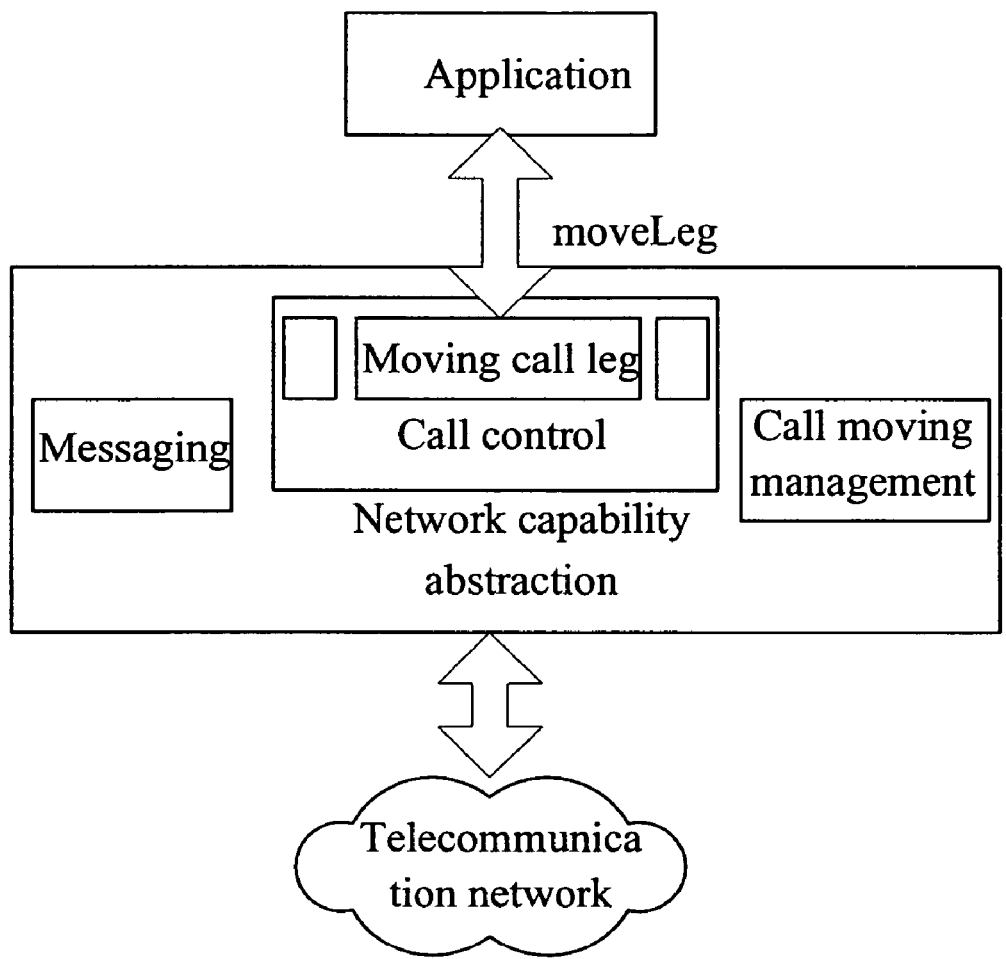
FIG. 1 shows a diagram of network structure with an open interface for call leg moving in accordance with one embodiment.

FIG. 1 shows a network structure of a telecommunication network with three layers, namely an upper layer, an intermediate layer and a lower layer. The upper layer is an application layer, the intermediate layer is a capability-abstracting layer, and the lower layer is a telecommunication network layer. The capability-abstracting layer makes capability abstract of the lower telecommunication layer and encapsulates the capabilities into independent functions, such as call control, messaging, moving management etc. Each independent function corresponds to an interface provided to the applications. Through invoking the interfaces an application uses the capacities of a telecommunication network in order to implement telecommunication service.

Each independent function includes some small functions. In the disclosed method and network structure, a call leg moving function is newly added in capability-abstracting layer, and the call leg moving interface corresponding to the call leg moving function and its parameters are added. The call leg moving interface is used to provide newly added call leg moving function to application layer. The parameters of the call leg moving interface at least include the interface reference parameters, which are the call leg identifier to be moved and the destination call identifier to be moved to. The interface reference parameters further include one output parameter for showing the moving result. Referring to FIG. 1, in this embodiment, the call leg moving function is one part of the whole call control function.

In this embodiment, a call leg moving interface may be implemented by defining a new IrpMultiPartyCall open interface. The IrpMultiPartyCall interface has one moveleg-method with two parameters: destCall: in IpMultiPartyCall and legID: TpCallLegIdentifier. The call leg moving function is implemented by this IrpMultiPartyCall interface where, the destCall: in IpMultiPartyCall, which is the interface reference of the destination call that the call leg will be moved to, is the identifier of the destination call; and the legID: TpCallLegIdentifier, which is the identifier of the call leg to be moved, includes an ID and an interface reference of the call leg. The IrpMultiPartyCall interface further has output parameter which is a Boolean value in this embodiment. After the IrpMultiPartyCall interface is invoked, this output parameter is used for showing the result of call leg move. When it is a true value, it shows that the call leg move is successful. When it is a false value, it shows that the call leg move failed.

In other embodiments of the disclosed method and network structure, the call leg moving function can be added to an existing interface that may be implemented as follows.

In the Parlay API multiparty call, the call leg moving function is added to the IpMultiPartyCall interface in order to implement making a call leg move from one call to another. The IpMultiPartyCall interface includes a moveleg method with parameters, destCall: in IpMultiPartyCall and legID: in TpCallLegIdentifier. The destCall: in IpMultiPartyCall, which is the interface reference of the destination call that the call leg will be moved to, is used as identifier of the destination call. The legID: TpCallLegIdentifier, which is the identifier of the call leg to be moved, includes an ID and an interface reference of the call leg. Also, the IpMultiPartyCall interface further has a output parameter which is a Boolean value in this embodiment. After the IrpMultiPartycall interface is invoked, this output parameter is used for showing the result of call leg move. When it is a true value, it shows that the call leg move is successful. When it is a false value, it shows that the call leg move failed.

Figure 2:
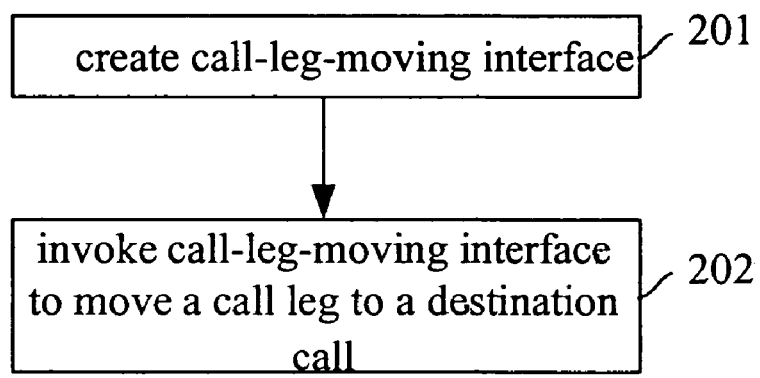
FIG. 2 shows a flowchart diagram of a method in accordance with one embodiment.

FIG. 2 shows that one embodiment of the disclosed method includes the following steps.

Step 201 creates a call leg moving interface and its parameters for moving a call leg from the original call to a destination call. The parameters at least include the interface reference parameters which are the call leg identifier to be moved and the destination call identifier to be moved to. The parameters further include an output parameter which is used to show the result of the call leg move.

In step 202, when an application wants to move a call leg, the interface reference parameters are decided according to the call leg to be moved and the destination call that the call leg will be moved to, and the application invokes the call leg moving interface with the interface reference parameters. And then the connection between the call leg and the original call is broken by the call leg moving interface and the voice channel resource occupied by the call leg in the original call is released. Later, a voice channel resource in the destination call is allocated to the call leg and the call leg is moved to the destination call. Finally, a result of the call leg move is returned to the application.

Figure 3:
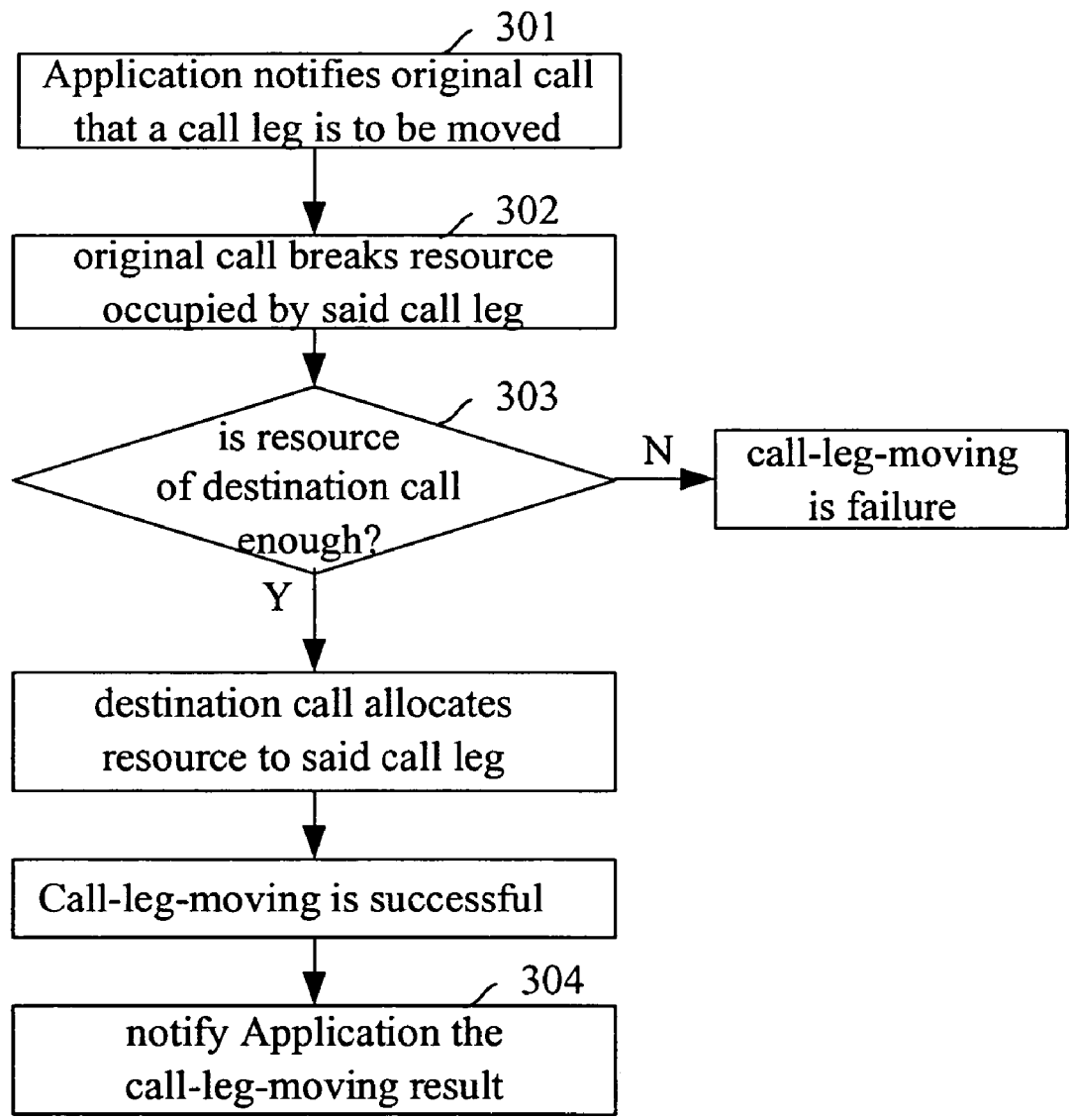
FIG. 3 shows a flowchart diagram implementing a call leg moving function in accordance with one embodiment.

FIG. 3 shows that the call leg moving interface may implement the call leg move method with the following steps.

In step 301, the application notifies the original call that a call leg will be moved to the destination call.

In step 302, the original call breaks the voice channel resource occupied by the call leg. The original call identifier in the call message is changed to the destination call identifier, and then a call leg move request is sent to the destination call, where the call messages at least include the call identifier, the media type, the charging policy and the terminal information. Changing the belonging of the leg is implemented by changing the call identifier of the call messages. In this embodiment, the media type, the charging policy and the terminal information are kept unchanged.

In step 303, having received the call leg move request from the original call, the destination call determines whether there is enough voice channel resource to allocate a voice channel to the call leg. If there is, a voice channel is allocated to the call leg and the call leg move is successful. Otherwise, the call leg move failed.

In step 304, based on the result of step 303, the destination call will notify the result to the original call, and then the original call will notify the application.

It can be seen from the description above that the call leg moving method may proceed as follows: break the voice channel resource occupied by the call leg in the original call, change messages related to the original call to messages related to the destination call, then allocate voice channel resource in the destination call to the call leg, which makes that the call leg can communicate with other call legs in the destination call. In this embodiment, while the call leg is moved, the call leg state and data in the original call are kept unchanged, and the call leg is in a suspended state in the original call so as to hold this call leg in the original call. At step 302, it is informed to the user terminal corresponding to the call leg that the call leg will be moved to the destination call in order that the user terminal can understand its call environment in time.

Two pre-conditions are satisfied to implement the call leg moving function. First, the call leg breaks connection of the resource having been allocated by the original call. Secondly, the destination call is created before the call leg moves to it.

Figure 4:
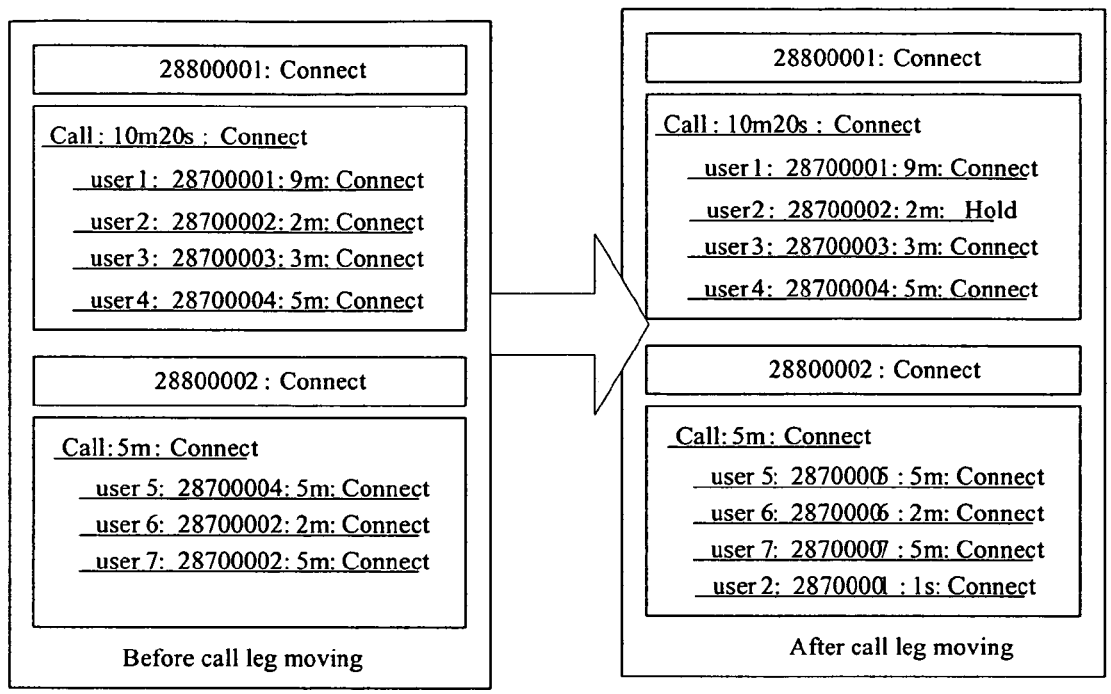
FIG. 4 shows a diagram of a multiparty chat on a Web page in accordance with one embodiment.

In FIG. 4, a multiparty chat service on a Web page is used to describe an application detail in accordance with one embodiment.

A Web multiparty chat service provides a Web page through which multiparty calls can be created and all current calls and the call parties in each call can be seen and managed.

FIG. 4 shows two calls with identifiers, 28800001 and 28800002, respectively. The call 28800001 has continued 10 minutes and 20 seconds with four users, namely users 1, 2, 3 and 4, each of which is one call party, i.e. one call leg of the call. The call 28800002 has continued 5 minutes with three users, namely users 5, 6 and 7.

As shown on the left side of FIG. 4, in the call 28800001, before a call leg is moved out, the user 1 with identifier 2870001 has communicated 9 minutes and is at the connection state. The user 2 with identifier 2870002 has communicated 2 minutes and is at the connection state. The user 3 with identifier 2870003 has communicated 3 minutes and is at the connection state. The user 4 with identifier 2870004 has communicated 5 minutes and is at the connection state. In the call 28800002 before a call leg is moved in, the user 5 with identifier 2870004 has communicated 5 minutes and is at the connection state. The user 6 with identifier 2870002 has communicated 2 minutes and is at the connection state, and the user 7 with identifier 2870002 has communicated 5 minutes and is at the connection state.

During the call, when user 2 or other authenticated persons drag the user 2 call leg from the call 28800001 to the call 28800002, it is equivalent that user 2 or other authenticated persons send out a call leg move request, and then the application will invoke the call leg moving interface to perform the call leg move.

As shown in the right side of FIG. 4, after the call leg has been moved, the user 2 in the call 28800001 is at a hold state and its call leg is suspended, so it cannot communicate with the other three users in the call, but its call messages are kept unchanged in the call 28800001. The user 2 is connected to the call 28800002 and can communicate with the user 5, 6 or 7.

When the user 2 has finished the communication in the call 28800002, it can be returned to the call 28800001 and communicates with users 1, 3 or 4 continuously, because its call messages, such as the media type and the charging information, are kept unchanged during departure.

When the call leg of the user 2 in the call 28800001 is at a suspended state, it can be released at any time. This means that the user 2 is disconnected with the call. Later, if the user 2 wants to join the call 28800001 again, user 2 should create the connection again.

Figure 5:
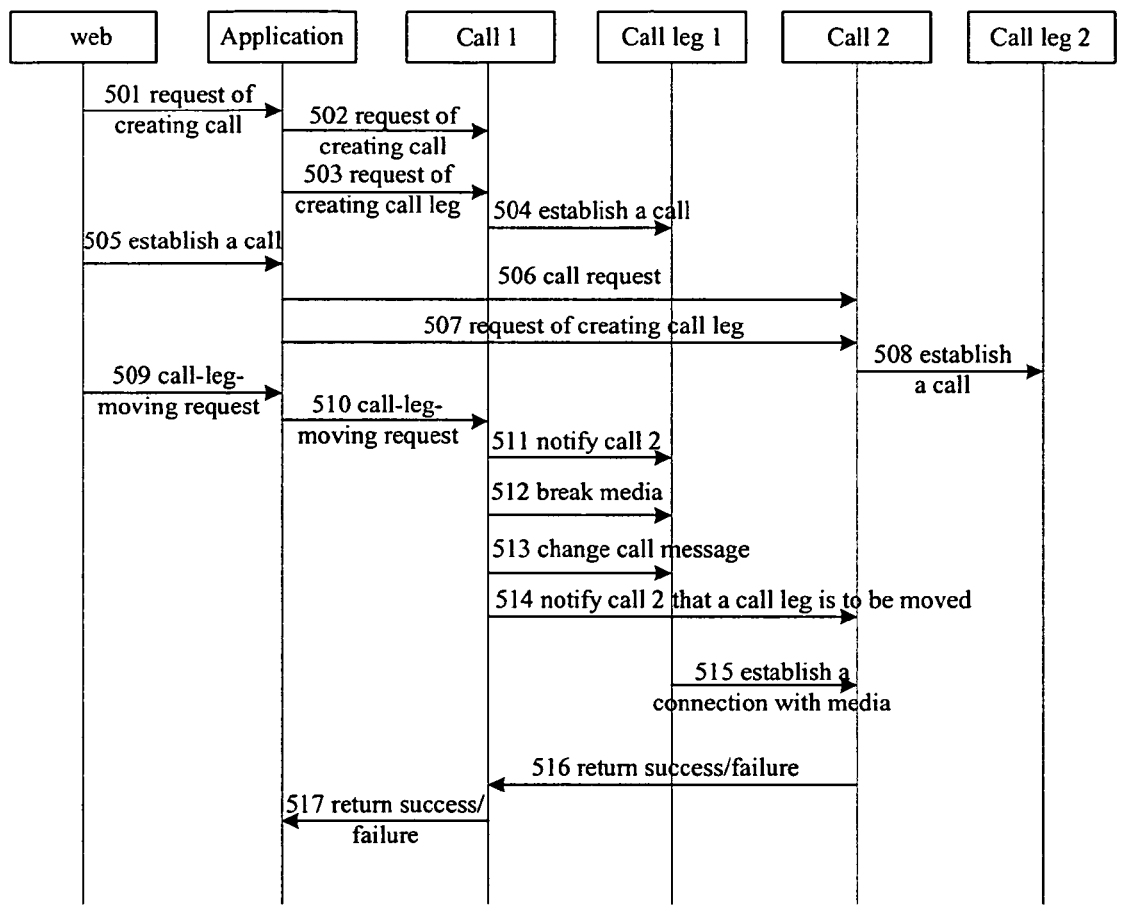
FIG. 5 shows a sequence diagram of a call leg move in accordance with one embodiment.

FIG. 5 is a sequence diagram of a call leg move service based on the call leg moving operation of FIG. 3.

In steps 501-504, user A invokes service application on a Web page and initiates a multiparty call request. The application creates a multiparty call with the call identifier MPCC Call1, and then according to the calling number set by user A, the MPCC Call1 creates a call leg with the identifier callLeg1 for user A.

In steps 505-508, user B invokes service application on a Web page and initiates another multiparty call request on a Web page. The application creates a multiparty call with the call identifier MPCC Call2, and then according to the calling number set by user B, the MPCC Call2 creates a call leg with the identifier callLeg2 for user B.

In steps 509-510, while the call is in progress, user A drags the callLeg1 from MPCC Call1 to MPCC Call2 on the Web page, and then the Application notifies MPCC Call1 that callLeg1 needs to be moved to MPCC Call2.

In steps 511-512, after having received the move leg notification, MPCC Call1 obtains the call leg to be moved according to the legID: in TpCallLegIdentifier and notifies user of callLeg1 that the call leg will be moved from MPCC Call1 to MPCC Call2. Then MPCC Call1 breaks the resource of callLeg1 allocated by MPCC Call1. From now on, callLeg1 is suspended and cannot communicate with other parties of MPCC Call1.

In step 513, MPCC Call1 notifies callLeg1 to update its call message. Those messages related to MPCC Call1 are changed to messages related to MPCC Call2, such as call identifier and the media resource channel etc. Other messages, such as media type, charging policy, terminal information, etc. are kept unchanged.

In step 514, MPCC Call1 obtains the destination call MPCC Call2 that the call leg callLeg1 will be moved to according to the destCall: in IpMultiPartyCall, and then MPCC Call1 notifies MPCC Call2 the callLeg1 to be joined to MPCC Call2 and transfers the call leg identifier to MPCC Call2.

In steps 515-516, after having received the move leg request from MPCC Call 1, MPCC Call2 allocates resource to callLeg1 and will report the allocation result, i.e., true or false, to MPCC Call1. If the resource allocation is successful, callLeg1 can communicate with other legs in MPCC Call2. Whether the resource allocation is successful depends on whether there are enough resources in MPCC Call2 and whether MPCC Call2 accepts the callLeg1.

In step 517, after having received the result from MPCC Call2, MPCC Call 1 determines whether the call leg move is successful. If it is successful, MPCC Call1 will return a true value to the application and, otherwise, a false value.

The resource in the above description, in steps 501 to 517, is the voice channel resource.

Although a number of embodiments of the disclosed method and network structure are described above, it is apparent that various modifications and changes can be made within the spirit and scope of the present invention.

The invention claimed is:

1. A method of implementing a call leg move, comprising:
   (A) creating, by a capability-abstracting layer of the network, a call leg moving interface and interface reference parameters of the call leg moving interface, wherein said interface reference parameters are an identifier of a call leg to be moved and a destination call identifier;
   (B) invoking, by an application layer of the network, said call leg moving interface with said interface reference parameters;
   notifying, by the application layer in the network, said original call that said call leg is being moved to said destination call, and releasing the resource of the original call occupied by the call leg;
   changing, by the application layer in the network, a call identifier of the call leg from the original call identifier to said destination call identifier through setting a call message of said call leg, sending a call leg move request to said destination call, and keeping state and data of the call leg unchanged dung the call leg move; and
   having received said call leg move request sent from said original call, said destination call determining whether said destination call has enough resource, and if said resource of said destination call is enough, said destination call allocating said resource to said call leg such that said call leg move is successful, and otherwise said call leg move is not successful,
   wherein said original call and said destination call are two different calls.

2. The method according to claim 1, wherein the destination call allocating said resource to said call leg comprises said destination call notifying said application layer of a call leg move result.

3. The method according to claim 1, wherein (B) further comprises notifying a user terminal corresponding to said call leg to be moved that said call leg will be moved to said destination call.

4. The method according to claim 1, wherein the application layer in the network changing said call identifier of the call leg comprises keeping a media type, a charging policy, and terminal information in said call message unchanged.

5. The method according to claim 1, wherein said original call and said destination call are a multiparty call; and wherein after moving from the original call to the destination call, the call leg is capable of communicating with other parties in the destination call, while the call leg is incapable of communicating with other parties in the original call.

6. The method according to claim 1, wherein moving the call leg in B comprises maintaining said call leg in a suspending state in said original call after the resource of the original call occupied by the call leg is released.

7. A network structure for a call leg move, the network structure comprising:
   a telecommunication network, a capability-abstracting layer and an application layer, said capability-abstracting layer to abstract capabilities of the telecommunication network into independent functions, wherein each independent function provides a corresponding interface to said application layer, and wherein, through invoking interfaces, said application layer is configured to provide services that are implemented by said independent functions;
   wherein said capability-abstracting layer comprises a call leg moving function, and a call leg moving interface provided to said application layer with a plurality of parameters comprising an identifier of a call leg to be moved and a destination call identifier;
   wherein the application layer is configured to invoke the call leg moving interface and set the parameters of the call leg moving interface in order to move the call leg from an original call to the destination call by releasing the resource of the original call occupied by the call leg and allocating the resource of the destination call to the call leg with the help of the call leg moving interface;
   wherein the state and data of the call leg is kept unchanged during the call leg move wherein the application layer is configured to notify said original call that said call leg is being moved to the destination call, and is configured to release the resource of the original call occupied by the call leg;
   wherein the application layer is configured to change a call identifier of the call leg from the original call identifier to said destination call identifier through setting a call message of said call leg, and is configured to send a call leg move request to said destination call; and
   wherein said destination call, having received said call leg move request sent from said original call, is configured to determine whether said destination call has enough resource, and if said resource of said destination call is enough, said destination call is to allocate said resource to said call leg such that said call leg move is successful, and otherwise said call leg move is not successful.

8. The network structure according to claim 7, wherein said call leg moving interface is an interface of Parlay Application Programming Interface (API) or Open Service Architecture (OSA) API with said plurality of parameters comprising said identifier of the call leg to be moved and said destination call identifier.

9. The network structure according to claim 7, said call leg moving interface is an open interface with said plurality of parameters comprising said identifier of the call leg to be moved and said destination call identifier.

10. The network structure according to claim 7, said call leg moving interface further includes an 'out' parameter for showing a result of the call leg move.

11. The method according to claim 1, wherein the destination call allocating resource to the call leg according to the resource of itself comprises:
   having received said call leg move request sent from said original call, said destination call determining whether said destination call has enough resource, and if said resource of said destination call is enough, said destination call allocating resource to said call leg, recording the state and data of the call leg in itself, and indicating that said call leg move is successful, and if the resource of the destination call is not enough, ending the call leg move and indicating that the call leg move fails.

* * * * *